(12) United States Patent
Liang et al.

(10) Patent No.: US 8,899,543 B2
(45) Date of Patent: Dec. 2, 2014

(54) SUPPORT STRUCTURE

(75) Inventors: Yong Liang, Shenzhen (CN); Lin-Lin Pan, Shenzhen (CN); Chia-Te Yu, New Taipei (TW); Liang-Yi Lu, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 179 days.

(21) Appl. No.: 13/491,678

(22) Filed: Jun. 8, 2012

(65) Prior Publication Data
US 2013/0306807 A1    Nov. 21, 2013

(30) Foreign Application Priority Data

May 18, 2012  (CN) .............................. 2012 1 015484

(51) Int. Cl.
 *A47B 23/04*          (2006.01)
(52) U.S. Cl.
 CPC ................................... *A47B 23/043* (2013.01)
 USPC ........... 248/454; 248/447; 248/458; 248/464; 248/166
(58) Field of Classification Search
 CPC .... A47B 23/04; A47B 23/042; A47B 23/043; A47B 23/044; A47B 19/08; A47B 97/08; F16M 11/16; F16M 11/38
 USPC ......... 248/447, 448, 454, 458, 460, 464, 165, 248/166
 See application file for complete search history.

(56) References Cited

U.S. PATENT DOCUMENTS

| | | | | |
|---|---|---|---|---|
| 5,078,276 A | * | 1/1992 | Rogge et al. | 211/18 |
| 5,973,244 A | * | 10/1999 | McCulloch | 84/327 |
| 7,066,438 B2 | * | 6/2006 | Ma | 248/448 |
| 7,470,843 B2 | * | 12/2008 | Hsieh | 84/329 |
| 7,503,539 B2 | * | 3/2009 | Knight | 248/448 |
| 7,669,822 B2 | * | 3/2010 | Kluge et al. | 248/308 |
| 7,712,719 B2 | * | 5/2010 | Derry et al. | 248/346.06 |
| 7,967,261 B2 | * | 6/2011 | Wilcox | 248/188.5 |
| 8,020,818 B2 | * | 9/2011 | Chou et al. | 248/176.1 |
| 8,146,870 B1 | * | 4/2012 | Cooper | 248/166 |
| 8,186,639 B2 | * | 5/2012 | Wang | 248/371 |
| 8,286,281 B1 | * | 10/2012 | Toothman | 5/81.1 R |
| 8,550,421 B2 | * | 10/2013 | Liu | 248/455 |
| 8,596,601 B1 | * | 12/2013 | Andersen | 248/447.2 |
| 2002/0070319 A1 | * | 6/2002 | Yu | 248/122.1 |
| 2005/0040311 A1 | * | 2/2005 | Lee | 248/454 |
| 2009/0140119 A1 | * | 6/2009 | To et al. | 248/455 |
| 2013/0306807 A1 | * | 11/2013 | Liang et al. | 248/124.1 |

* cited by examiner

*Primary Examiner* — Jonathan Liu
*Assistant Examiner* — Guang H Guan
(74) *Attorney, Agent, or Firm* — Novak Druce Connolly Bove + Quigg LLP

(57) ABSTRACT

A support structure includes a base, a pair of stands, a top hinge, and a pair of holding arms. The stands are rotatably connected to one end of the base to support the base. The top hinge is rotatably connected to the other end of the base opposite to the stands. The rotation plane of the top hinge is perpendicular to the rotation plane of the stands. The holding arms are rotatably connected to the top hinge for holding an object at any desired angle.

4 Claims, 9 Drawing Sheets

SUPPORT STRUCTURE

TECHNICAL FIELD

The disclosure generally relates to support structures, and particularly, to a support structure for supporting an electronic device.

DESCRIPTION OF RELATED ART

Many electronic devices do not have self-support structures; and need to be held by hand. However, it is fatiguing for a user to hold an electronic device by hand for a long time when watching a film for example.

Therefore, it is desirable to provide a support structure which can overcome the above-mentioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding portions throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
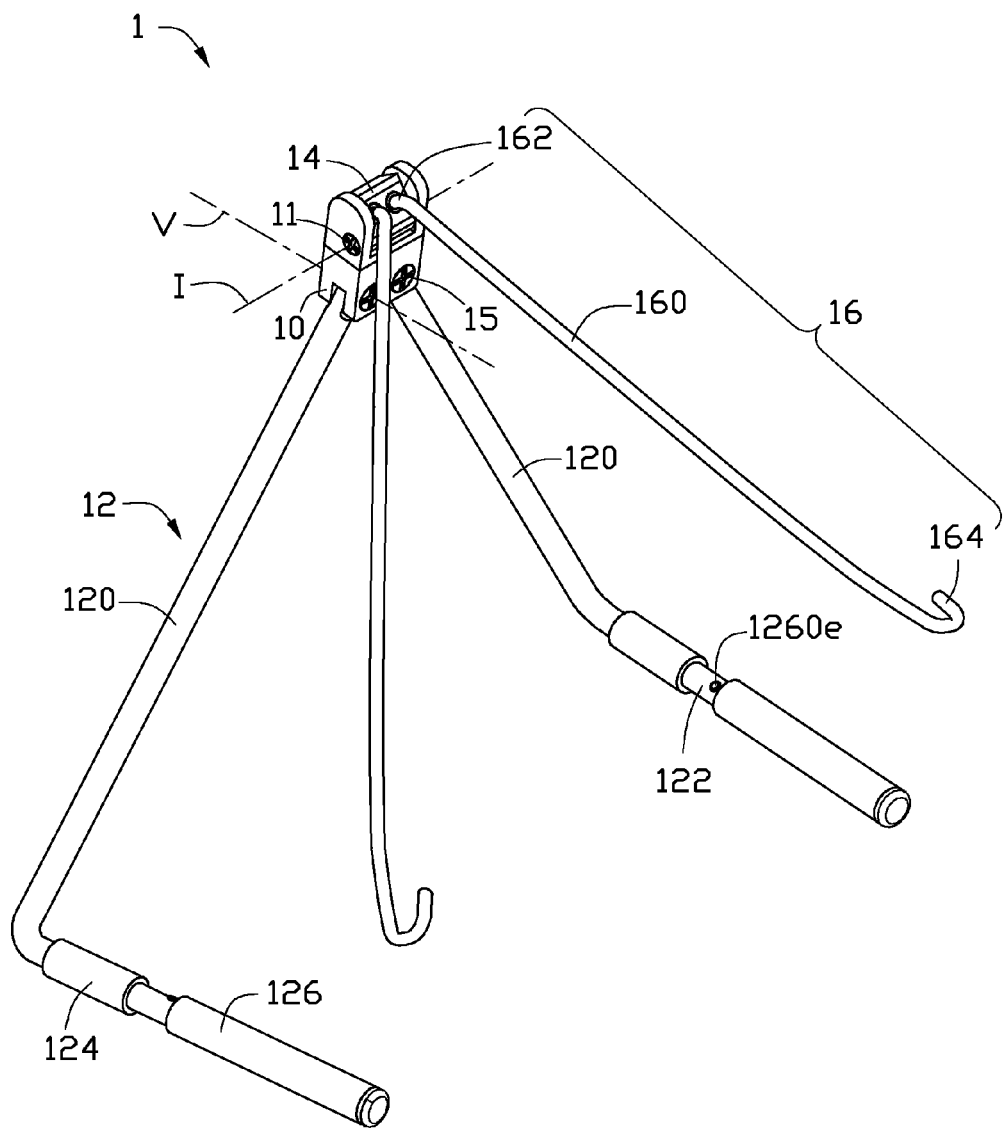
FIG. 1 is an isometric view of a support structure in accordance with a first embodiment of the present disclosure.
Figure 2:
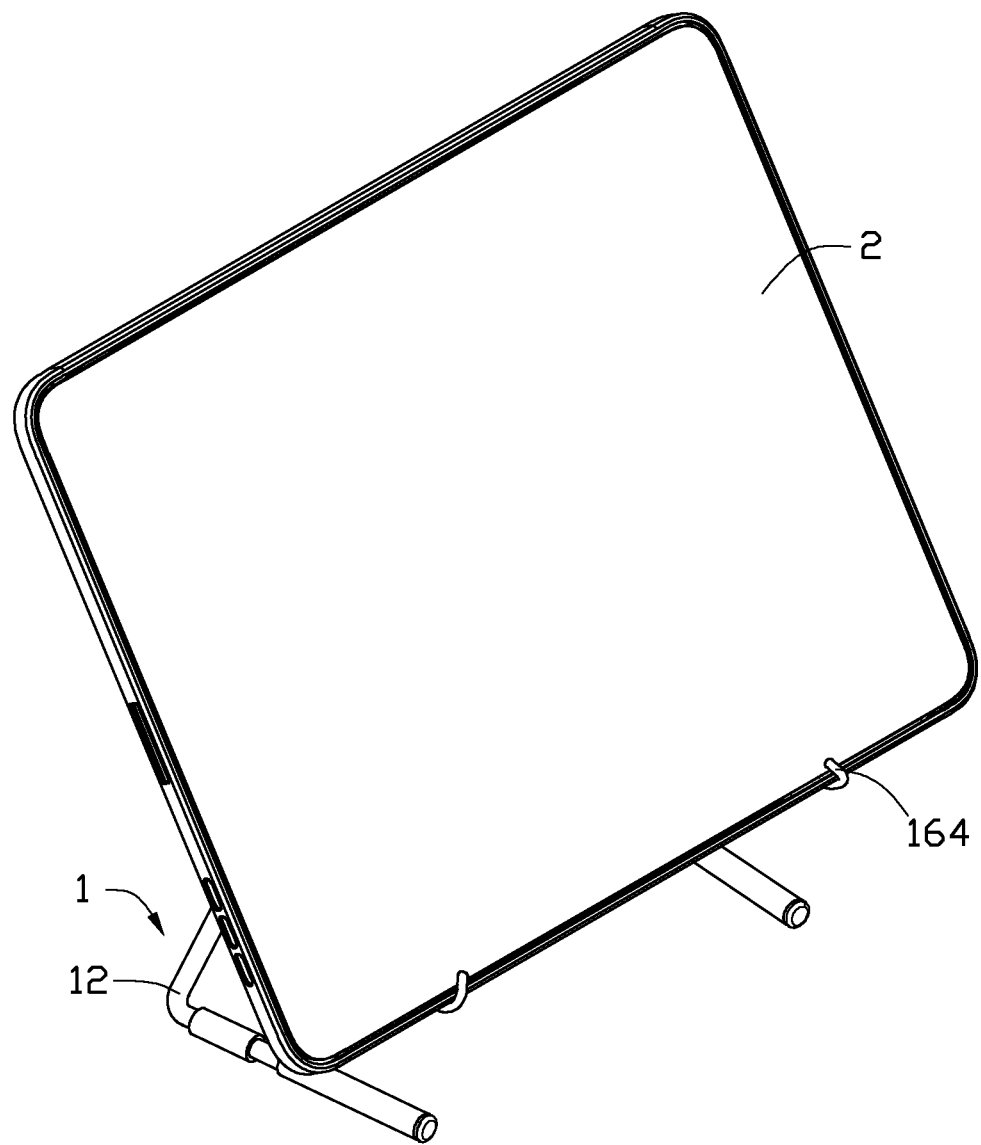
FIG. 2 is an isometric view of the support structure of FIG. 1, when an electronic device is being held by the support structure.

Refering to FIGS. 1 and 2, in one embodiment, a support structure 1 includes a base 10, a pair of stands 12, a top hinge 14, and a pair of holding arms 16. The stands 12 are rotatably connected to one side of the base 10 to support the base 10. The top hinge 14 is rotatably connected to the other side of the base 10. The rotation axis I of the top hinge 14 is perpendicular to the rotation axis V of the stands 12. The holding arms 16 are for holding an object and are rotatably connected to a side surface of the top hinge 14. In this embodiment, the stands 12 are connected to opposite ends of the side of the top hinge 14. The pair of holding arms 16 is capable of being held open at a certain angle to hold an electronic device 2, such as, a tablet computer, an electronic book, a cellular phone, or a game console. In an alternative embodiment, the stand 12 is a single piece and firmly fixed to the base 10.

Figure 3:
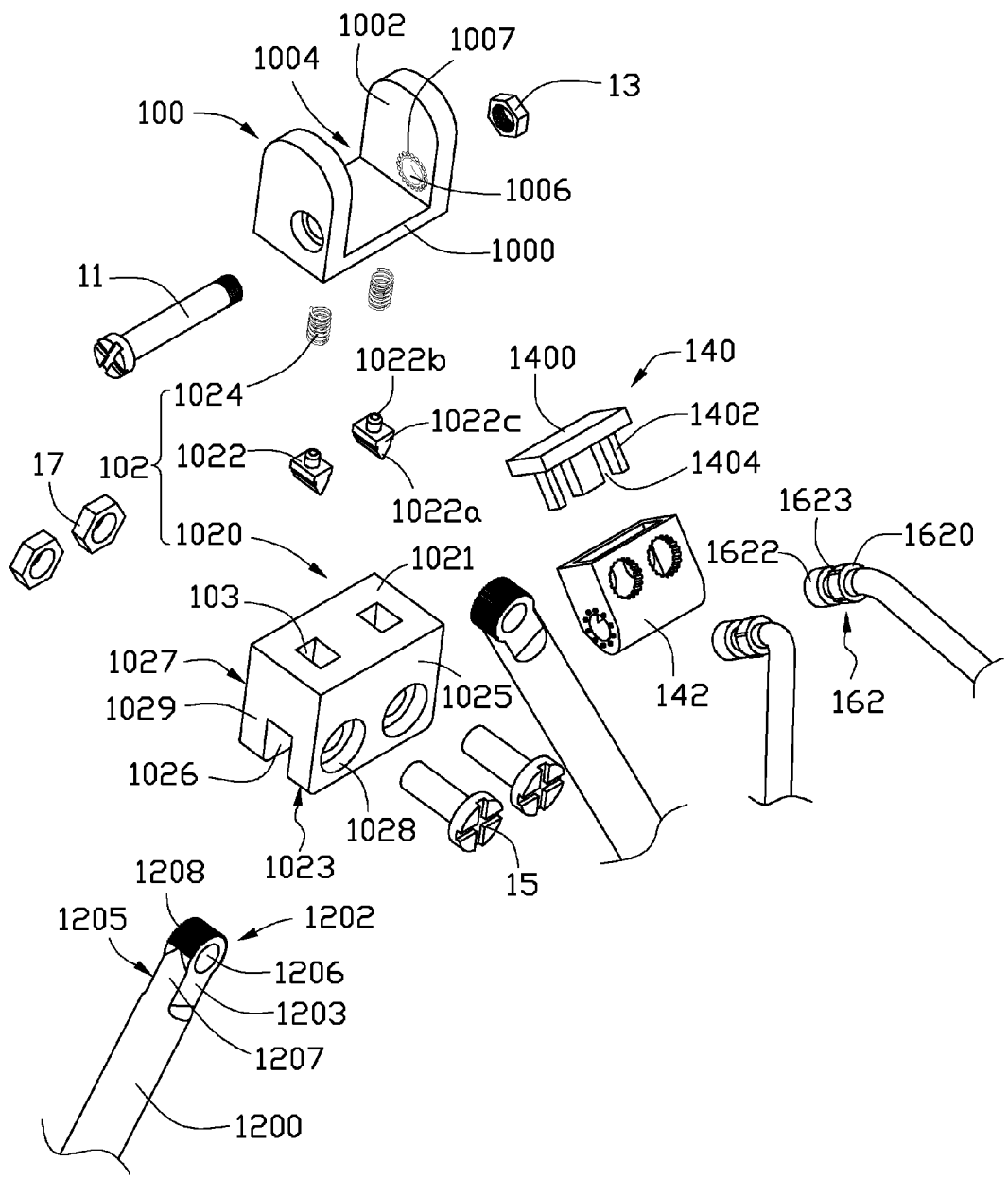
FIG. 3 is an exploded, isometric view of a portion of the support structure of FIG. 1.

Referring to FIG. 3, the top hinge 14 includes an upper cover 140 and a case body 142. The upper cover 140 includes a cover plate 1400 and a number of clipping protrusions 1402. Each two adjacent clipping protrusions 1402 define a clipping gap 1404 therebetween.

Figure 4:
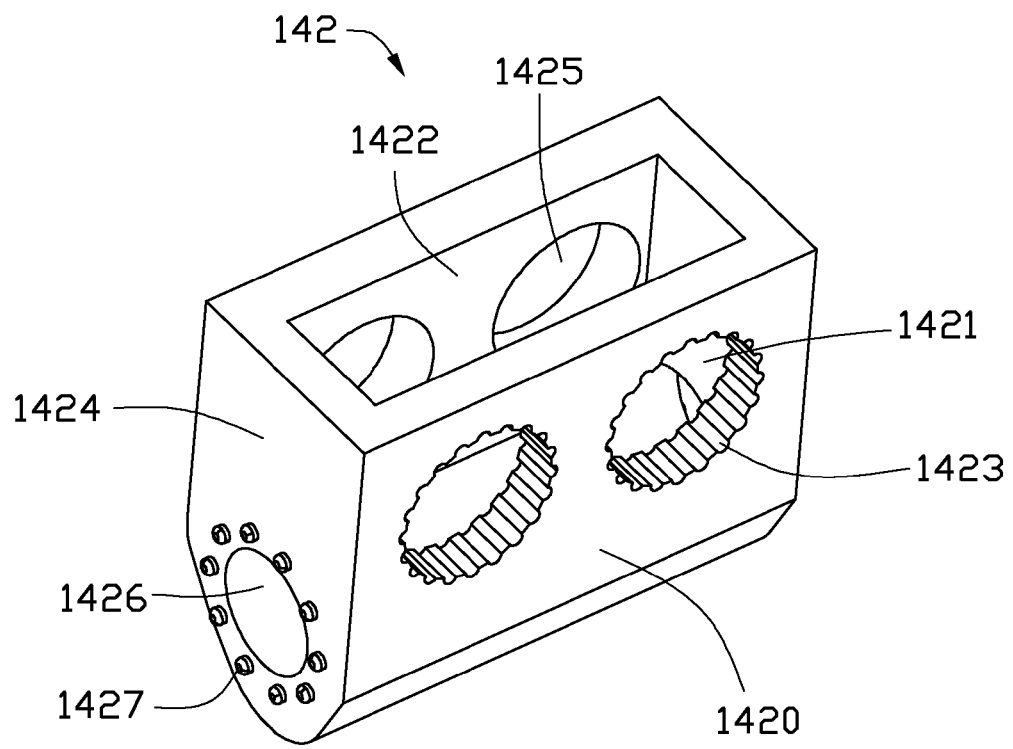
FIG. 4 is an isometric view of a top hinge of the support structure of FIG. 1

Referring also to FIG. 4, the case body 142 is substantially a rectangular hollow cavity. The case body 142 includes a front plate 1420, a back plate 1422, and a pair of side plates 1424. The front plate 1420 is parallel to the back plate 1422. The side plates 1424 are connected to opposite sides of both the front plate 1420 and the back plate 1422. The front plate 1420, the back plate 1422, and the side plates 1424 cooperatively define an opening to the hollow cavity. The bottom of the hollow cavity is covered by a curved board. The case body 142 defines a pair of positioning through holes 1421 in the front plate 1420. Each positioning through hole 1421 includes a number of positioning teeth 1423 formed on an inner side surface (not shown) of the positioning through hole 1421 along a direction perpendicular to the front plate 1420. The positioning teeth 1423 are evenly spaced. The case body 142 further defines a pair of receiving through holes 1425 in the back plate 1422 concentric with the positioning through holes 1421. The case body 142 defines a first rotating through hole 1426 in each side plate 1424. The first rotating through holes 1426 are coaxial. Each side plate 1424 includes a number of positioning protrusions 1427 located in a circle which encircles the first rotating through hole 1426 and having a same center with the first rotating through hole 1426. Especially, the positioning protrusions 1427 have an even angular gap around the first rotating through hole 1426.

Referring to FIGS. 1 and 3, the holding arm 16 includes a holding portion 160, a connecting portion 162, and a supporting portion 164. The holding portion 160 may be substantially a cylindrical elongated post. The holding portion 160 includes two opposite ends. The supporting portion 164 is formed in the shape of a hook by the backward and upward bending of one of the opposite sides of the holding portion 160. The connecting portion 162 extends perpendicularly or obliquely downwards from the other one of the opposite ends of the holding portion 160. A positioning flange 1620 and a fixing flange 1622 are formed at the connecting portion 162. The fixing flange 1622 is formed at a distal end of the connecting portion 162 which is away from the holding portion 160. The positioning flange 1620 includes a number of positioning projections 1623 formed on a cylindrical side wall of the positioning flange 1620. Each of the positioning projections 1623 is parallel to a longitudinal direction of the connecting portion 162. In this embodiment, the positioning flange 1620 includes four positioning projections 1623, and the positioning projections 1623 are 90 degrees apart.

Figure 6:
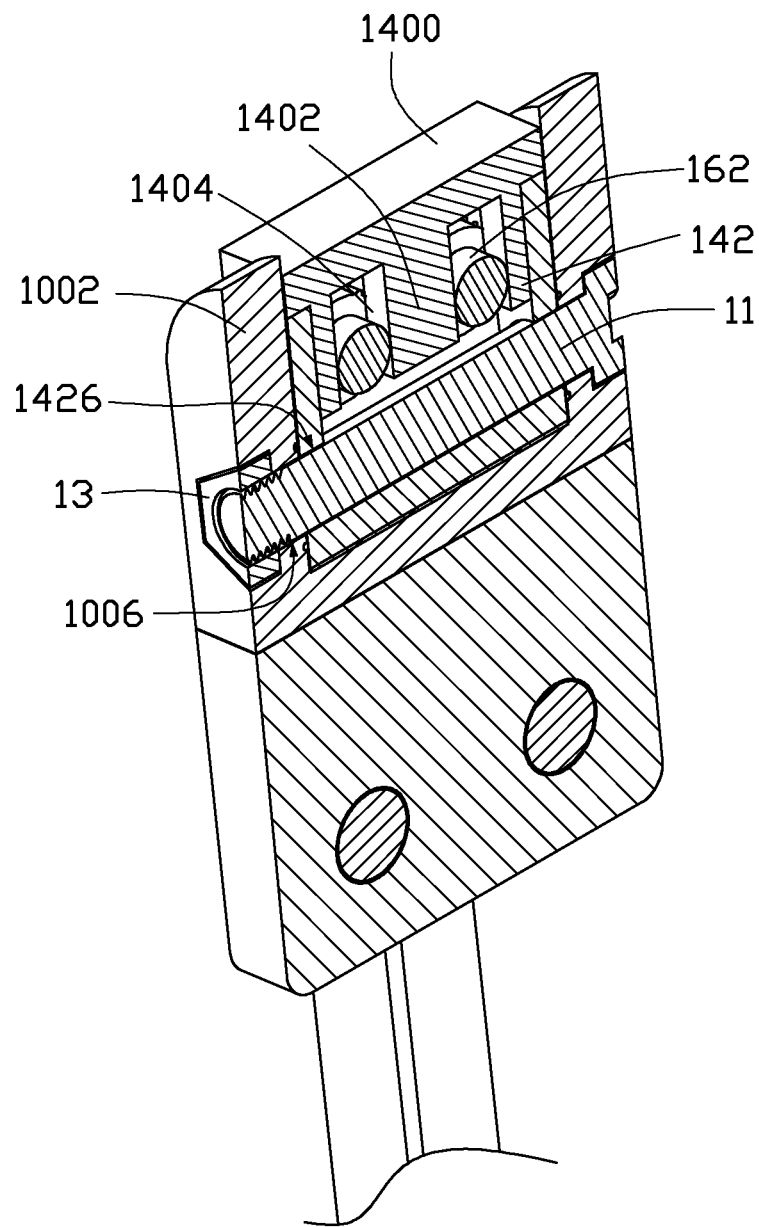
FIG. 6 is a cross-sectional, isometric view taken along the line VI-VI of FIG. 4.

Referring to FIGS. 1, 3, and 6, the connecting portions 162 are inserted into the case body 142 via the positioning through holes 1421. The fixing flanges 1622 are accommodated in the receiving through holes 1425. The positioning flanges 1620 are accommodated in the positioning through holes 1421. The positioning projections 1623 mesh with the positioning teeth 1423. The clipping protrusions 1402 of the upper cover 140 are inserted into the case body 142 via the opening of the case body 142; and the cover plate 1400 covers the opening of the case body 142. Every two adjacent clipping protrusions 1402 act as a clip on a section of each connecting portion 162 between the positioning flange 1620 and the fixing flange 1622 via the clipping gap 1404. Thus, the holding arm 16 is rotatable around the central axis of the connecting portion 162. During the rotation of the holding arm 16, the positioning projections 1623 engage with the positioning teeth 1423 at different angles in order to position the holding arm 16 at a certain angle. In this embodiment, the two holding arms 16 can engage with different positioning through holes 1421, thus the rotation angle of each holding arm 16 is independently adjustable.

Referring to FIGS. 3 and 6, the base 10 includes a fixing plate 100 rotatably connected to the top hinge 14 and a connecting part 102 rotatably connected to the stands 12. The fixing plate 100 is fastened on the connecting part 102.

The fixing plate 100 includes a bottom board 1000 and a pair of side arms 1002 extending perpendicularly and upwardly from opposite sides of the bottom board 100. The pair of side arms 1002 defines a receiving space 1004 therebetween. The fixing plate 100 defines a second rotating through hole 1006 on each side arm 1002 corresponding to the first rotating through hole 1426. Each of the side arm 1002 defines a number of evenly spaced positioning recesses 1007 encircling the second rotating through hole 1006 on a surface of the side arm 1002 facing the receiving space 1004. The quantity of the positioning recesses 1007 is greater than the quantity of the positioning protrusions 1427.

The top hinge 14 assembled with the holding arms 16 is placed in the receiving space 1004 between the side arms 1002. The second rotating through holes 1006 are aligned with the first rotating through holes 1426. The positioning protrusions 1427 are inserted into the positioning recesses 1007. The top hinge 14 is rotatably connected to the side arms 1002 by a bolt 11 engaging with a rotating nut 13 after passing through the first rotating through holes 1426 and the second rotating through holes 1006. Thus, the top hinge 14 can rotate around the bolt 11. During the rotation of the top hinge 14, the positioning protrusions 1427 engage with different positioning recesses 1007 to position the top hinge 14 at a desired angle.

Figure 7:
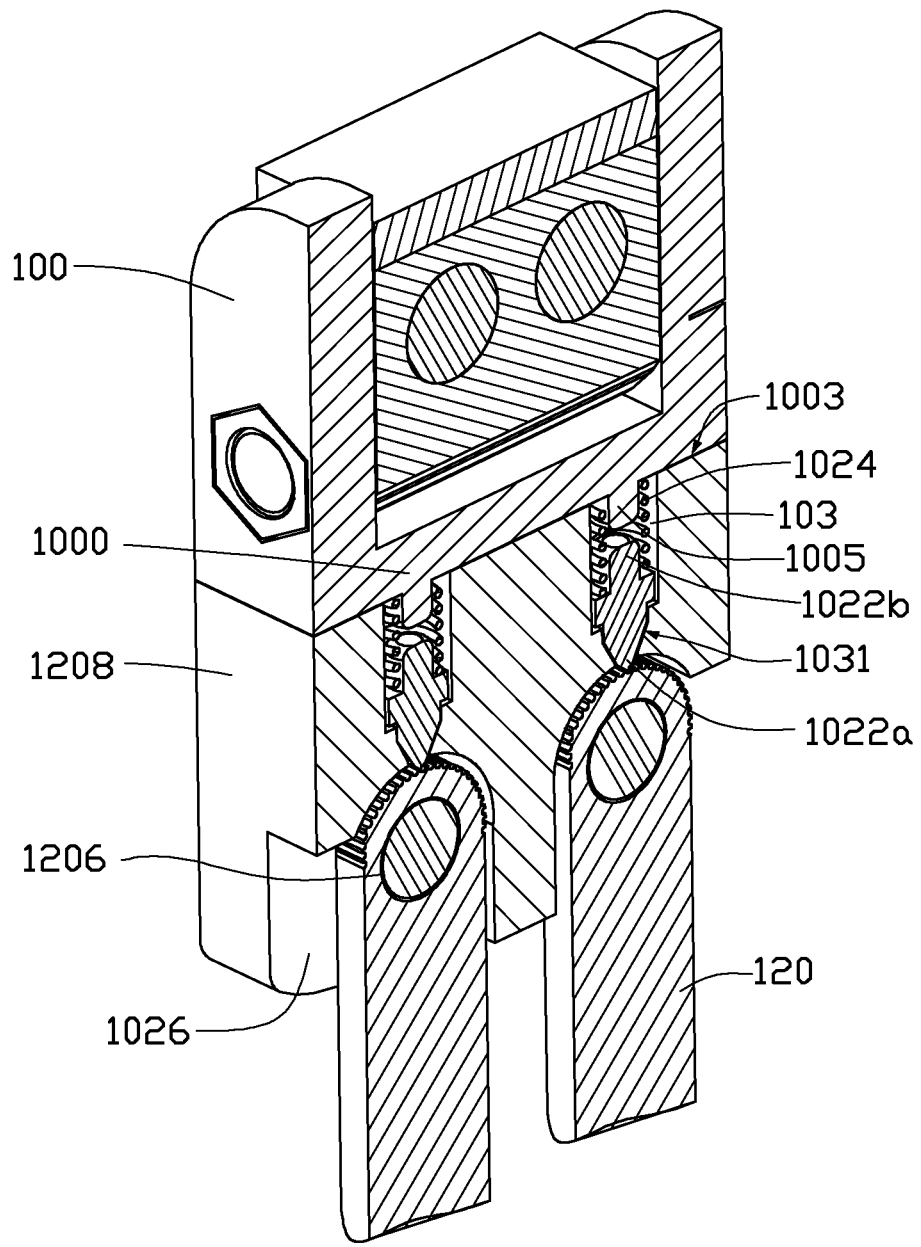
FIG. 7 is a cross-sectional, isometric view taken along the line VII-VII of FIG. 4.

Referring to FIGS. 3 and 7, the connecting part 102 includes a connecting case 1020, a pair of positioning blocks 1022, and a pair of positioning resilient elements 1024. The connecting case 1020 includes a top surface 1021, a bottom surface 1023, a front surface 1025, a back surface 1027, and a pair of parallel side surfaces 1029 connecting with the top surface 1021, the bottom surface 1023, the front surface 1025, and the back surface 1027. The connecting case 1020 defines a pair of connecting grooves 1026 at opposite connecting sections of the bottom surface 1023 and the side surfaces 1029. The connecting case 1020 defines a pair of connecting through holes 1028 in the front surface 1025. Each of the connecting through holes 1028 passes through the front surface 1025 and the back surface 1027 and communicates with the connecting groove 1026. The connecting case 1020 defines a pair of positioning grooves 103 in the top surface 1021 corresponding to the connecting grooves 1026. The bottom of each positioning groove 103 defines a passage 1031 extending from the positioning groove 103 to the connecting groove 1026. The width of the passage 1031 gradually restricts movement from the positioning groove 103 to the connecting groove 1026.

The positioning block 1022 includes a main body 1022c, and a positioning tip 1022a and a first connecting protrusion 1022b formed at opposite ends of the main body 1022c. The cross sectional area of the main body 1022c gradually reduces from one end connecting with the first connecting protrusion 1022b to the other opposite end connecting with the positioning tip 1022a. The positioning tip 1022a has a smaller cross sectional area than the main body 1022c. The bottom board 1000 of the fixing plate 100 includes a lower surface 1003 and a pair of second connecting protrusions 1005 extending from the lower surface 1003 and corresponding to the positioning grooves 103. The positioning blocks 1022 are connected to the second connecting protrusions 1005 by means of one end of the positioning resilient element 1024 connecting with the first connecting protrusion 1022b and the other end of the positioning resilient element 1024 connecting with the second connecting protrusion 1005.

The lower surface 1003 is firmly connected to the top surface 1021 by adhesive or by ultrasonic welding. The positioning blocks 1022 and the positioning resilient elements 1024 are received in the positioning grooves 103. The positioning tip 1022a is inserted into the connecting groove 1026 via the passage 1031. The positioning blocks 1022 are movable along a direction perpendicular to the rotation axis of the top hinge and the rotation axis of the stands 12 against a resilience of the positioning resilient element 1024. In this embodiment, the positioning resilient element 1024 is a spring.

Each of the stands 12 includes a main stand 120, an auxiliary stand 122, a connecting assembly 124 connecting the main stand 120 and the auxiliary stand 122, and a telescopic assembly 126 attached to the auxiliary stand 122. The main stand 120 includes a main part 1200, a connecting end 1202, and a supporting part 1204. The main stand 120 is rotatably connected to the connecting case 1020 via the connecting end 1202. The auxiliary stand 122 connects with a distal end of the supporting part 1204 away from the connecting case 1020. The main part 1200 is substantially a cylindrical elongated post. The connecting end 1202 extends from one end of the main part 1200 along a longitudinal direction of the main part 1200. The connecting end 1202 is plate-shaped and includes a first surface 1203, a second surface 1205 parallel to the first surface 1203, and an outer side surface 1207 connecting with the first surface 1203 and the second surface 1205. The connecting end 1202 defines a pivoting through hole 1206 passing through the first surface 1203 and the second surface 1205. The outer side surface 1207 is substantially cylindrical and partly encircles the pivoting through hole 1206. A number of adjusting teeth 1208 are formed on the outer side surface 1207 of the connecting end 1202. The adjusting teeth 1208 extend along the central axis of the pivoting through hole 1206.

The connecting ends 1202 are inserted into the connecting grooves 1026. The pivoting through holes 1206 align with the connecting through holes 1028. The main stands 120 are rotatably connected to the connecting case 1020 by bolts 15 passing through the connecting through holes 1028 and the pivoting through holes 1206 and engaging with nuts 17. The positioning tips 1022a are inserted into the connecting grooves 1026 and engage with the adjusting teeth 1208 for positioning the rotation angles of the main stands 120.

Figure 8:
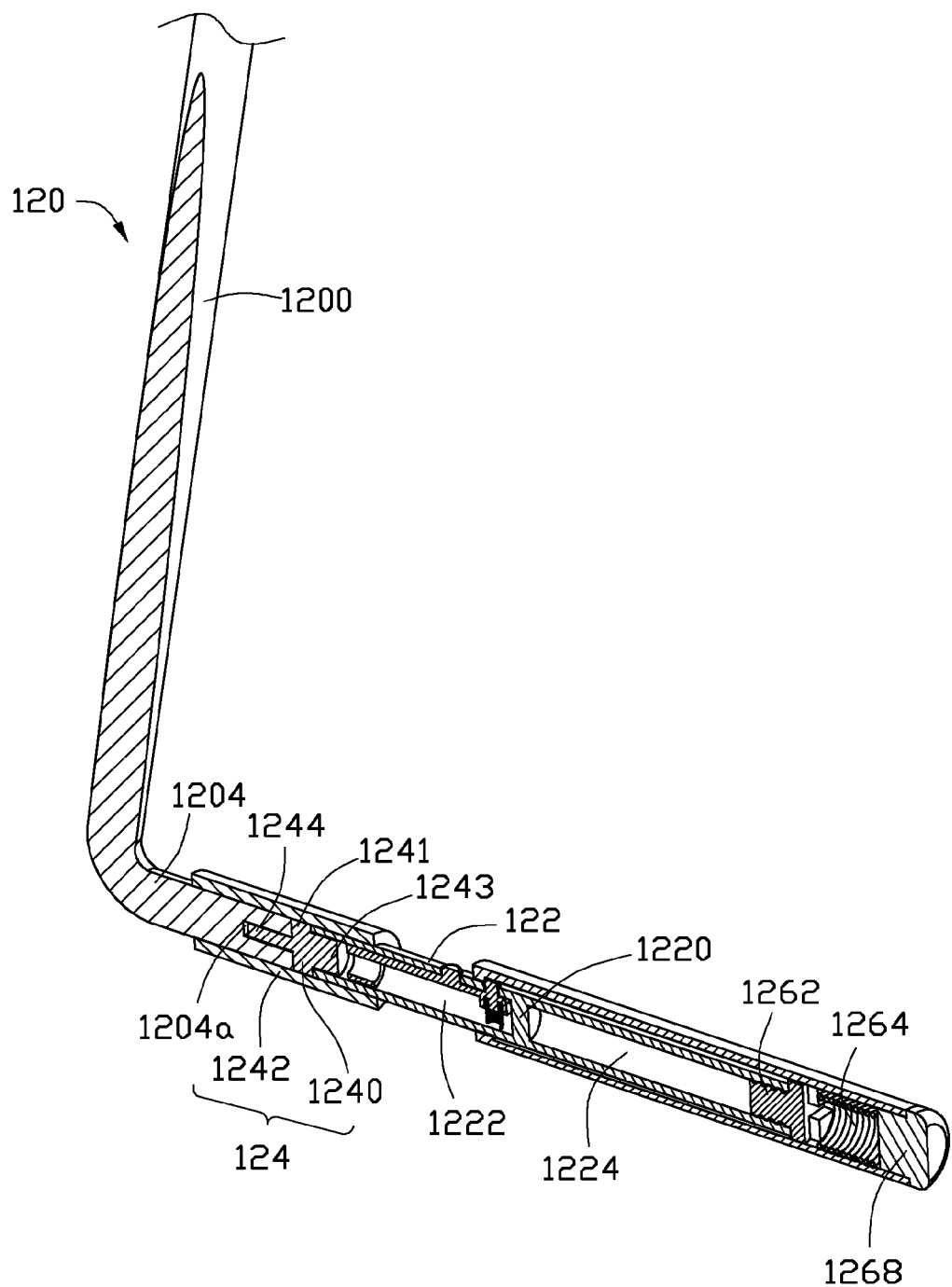
FIG. 8 is a partial cutaway view of a stand of the support structure of FIG. 1.
Figure 9:
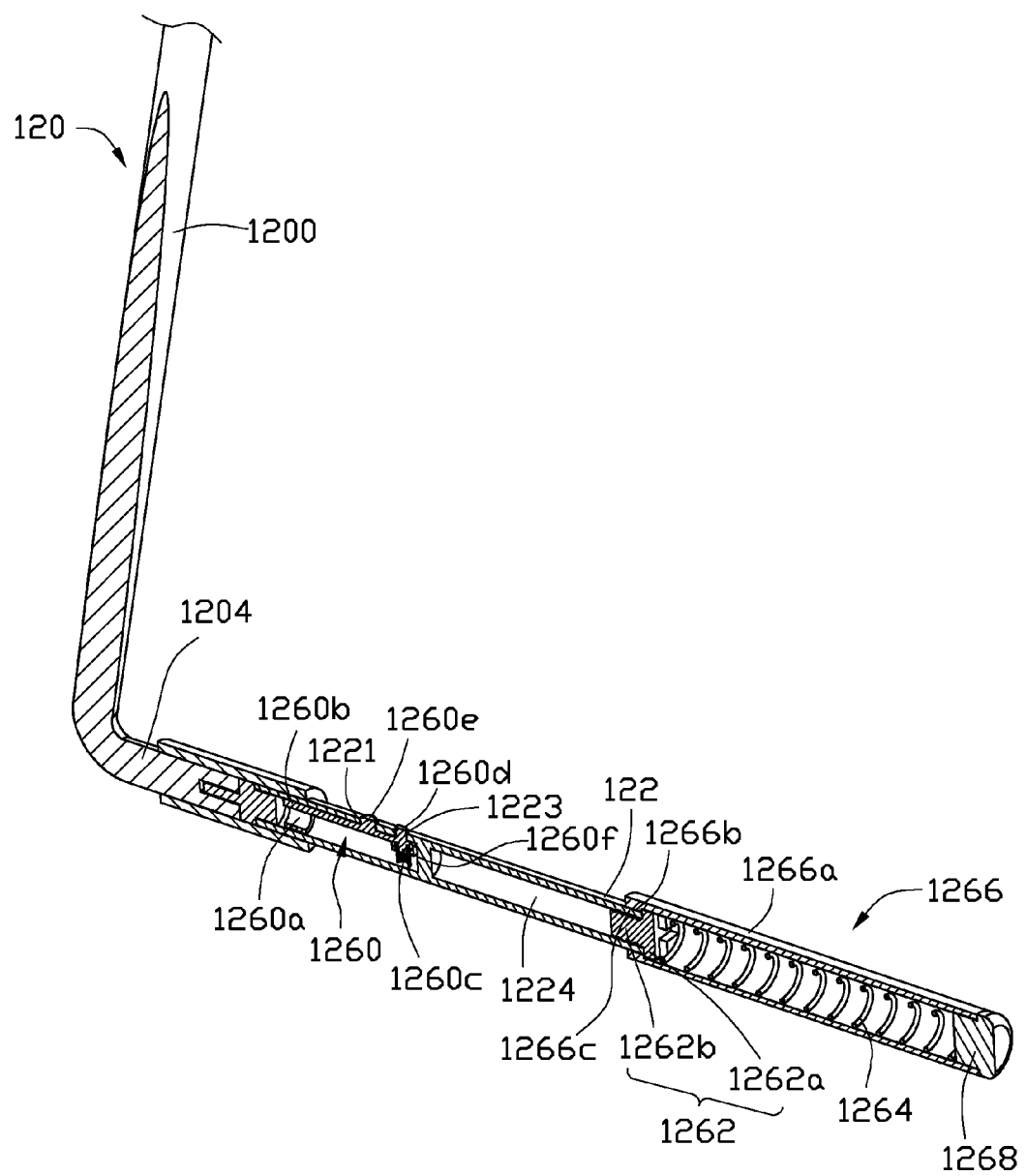
FIG. 9 is a partial cutaway view of the stand of FIG. 8, with a stabilizing extension extending outwards.

Referring to FIGS. 8 and 9, the supporting part 1204 extends from the other end of the main part 1200 opposite to the connecting end 1202. The supporting part 1204 extends along a direction which is inclined at a certain angle relative to the longitudinal direction of the main part 1200. The supporting part 1204 is substantially cylindrical and defines a blind hole 1204a at a distal end away from the main part 1200. In this embodiment, the inclined angle between the supporting part 1204 and the main part 1200 is less than 90 degrees.

The auxiliary stand 122 is an elongated hollow cylindrical pillar. The ends of the auxiliary stand 122 are open. The interior of the auxiliary stand 122 is divided into a first receiving room 1222 and a second receiving room 1224 by a separating wall 1220. The first receiving room 1222 is connected to the supporting part 1204 via the connecting assembly 124. The second receiving room 1224 is connected to the telescopic assembly 126.

The connecting assembly 124 includes a connector 1240 and a first sleeve 1242. The connector 1240 includes a middle part 1241, a first connecting projection 1244, and a second connecting projection 1243. The first connecting projection 1244 and the second connecting projection 1243 extend along two inverse directions at opposite sides of the middle part 1241. The first connecting projection 1244 is inserted into the blind hole 1204a. The second connecting projection 1243 is inserted into the first receiving room 1222. The first sleeve 1242 tightly wraps around the connector 1240, a part of the supporting part 1204 connecting with the connector 1240, and a part of the first receiving room 1222 connecting with the connector 1240. In this embodiment, the external diameter of the middle part 1241 is the same as the external diameter of the supporting part 1204 and the external diameter of the first receiving room 1222. The first sleeve 1242 is made of a resilient material.

The telescopic assembly 126 includes a button set 1260, a resisting member 1262, a telescopic resilient element 1264, a stabilizing extension 1266, and a bottom plug 1268. The button set 1260 is received in the first receiving room 1222 and includes a basic body 1260a, a resilient arm 1260b, and a restoring resilient element 1260c. The basic body 1260a is a hollow cylindrical ring. The resilient arm 1260b extends from a part of a side wall of the basic body 1260a along the central axis of the basic body 1260a. The resilient arm 1260b includes a blocking protrusion 1260d extending from an upper surface opposite to the basic body 1260a at a distal end of the resilient arm 1260b away from the basic body 1260a, and a button protrusion 1260e extends from the upper surface between the basic body 1260a and the blocking protrusion 1260d, and a holding protrusion 1260f extends from an lower surface 1003 opposite to the upper surface and corresponding to the blocking protrusion 1260d.

The button set 1260 is made of a resilient material. The external diameter of the basic body 1260a is the same as the internal diameter of the first receiving room 1222. The outer surface of the basic body 1260a is in close contact with the inner surface of the first receiving room 1222. The upper surface of the resilient arm 1260b is in close contact with the inner surface of the first receiving room 1222. The auxiliary stand 122 defines a button through hole 1221 corresponding to the button protrusion 1260e and a blocking through hole 1223 corresponding to the blocking protrusion 1260d on a side wall of the first receiving room 1222. The button protrusion 1260e extends out of the first receiving room 1222 via the button through hole 1221. The blocking protrusion 1260d extends out of the first receiving room 1222 via the blocking through hole 1223. One end of the restoring resilient element 1260c is fastened to the holding protrusion 1260f, the other end of the restoring resilient element 1260c pushes against the inner surface of the first receiving room 1222 to provide a restoring force to the blocking protrusion 1260d.

The resisting member 1262 includes a resisting block 1262a and a threaded post 1262b extending from the resisting block 1262a. The resisting block 1262a is substantially cylindrical. The diameter of the resisting block 1262a is larger than the diameter of the second receiving room 1224; and the threaded post 1262b meshes with the second receiving room 1224. The stabilizing extension 1266 includes a side wall 1266a and a blocking board 1266b perpendicularly connecting with one end of the side wall 1266a. The other end of the side wall 1266a opposite to the blocking board 1266b is open. The stabilizing extension 1266 defines a resisting opening 1266c in a center of the blocking board 1266b. The diameter of the resisting opening 1266c is larger than the diameter of the second receiving room 1224. The stabilizing extension 1266 sleeves on the outer surface of the auxiliary stand 122 via the resisting opening 1266c. The threaded post 1262b screws into the open end of the second receiving room 1224. The periphery of the resisting block 1262a resists against the blocking board 1266b of the stabilizing extension 1266 to prevent the stabilizing extension 1266 from sliding out of the auxiliary stand 122. The telescopic resilient element 1264 is received in the stabilizing extension 1266. The bottom plug 1268 is attached to the opening end of the stabilizing extension 1266 opposite to the blocking board 1266b. The telescopic resilient element 1264 is compressed between the resisting member 1262 and the bottom plug 1268. One end of the telescopic resilient element 1264 resists against the resisting member 1262, and the other end of the telescopic resilient element 1264 resists against the bottom plug 1268.

When the blocking board 1266b is slid to a position between the button protrusion 1260e and the blocking protrusion 1260d, the blocking protrusion 1260d resists again an inner side of the blocking board 1266b to hold the stabilizing extension 1266 on the auxiliary stand 122. When the length of the auxiliary stand 122 needs to be extended, the button protrusion 1260e is pressed downward to retract the blocking protrusion 1260d back into the first receiving room 1222, and the stabilizing extension 1266 will be pushed away from the auxiliary stand 122 under a force applied by the telescopic resilient element 1264 until the blocking board 1266b resist against the periphery of the resisting block 1262a.

In use, the pair of the main stands 120 is opened to a suitable angle by rotating the main stands 120 around the bolts 15. Thus, the base 10 is supported by the stands 12. The holding arms 16 are rotated around the central axis of the connecting portion 162 to be opened at a suitable angle. Thus, the bottom of the electronic device 2 can be held on the supporting portion 164 of the holding arm 16. The main portion of the electronic device 2 leans on the holding portion 160 of the holding arm 16. The top hinge 14 can be pivoted around the bolt 11 to adjust the orientation of the top hinge 14. Thus, the electronic device 2 can be made to face out at a suitable viewing angle. Pressing the button protrusion 1260e releases the stabilizing extension 1266 on the auxiliary stand 122 to extend the length of the auxiliary stand 122 for enhancing the stability of the stands 12.

In an alternative embodiment, the connecting assembly 124 and the auxiliary stand 122 are omitted. The telescopic assembly 126 can be installed in the main stand 120. The structure of the telescopic assembly 126 in the main stand 120 is similar to the structure of the telescopic assembly 126 in the auxiliary stand 122.

Figure 5:
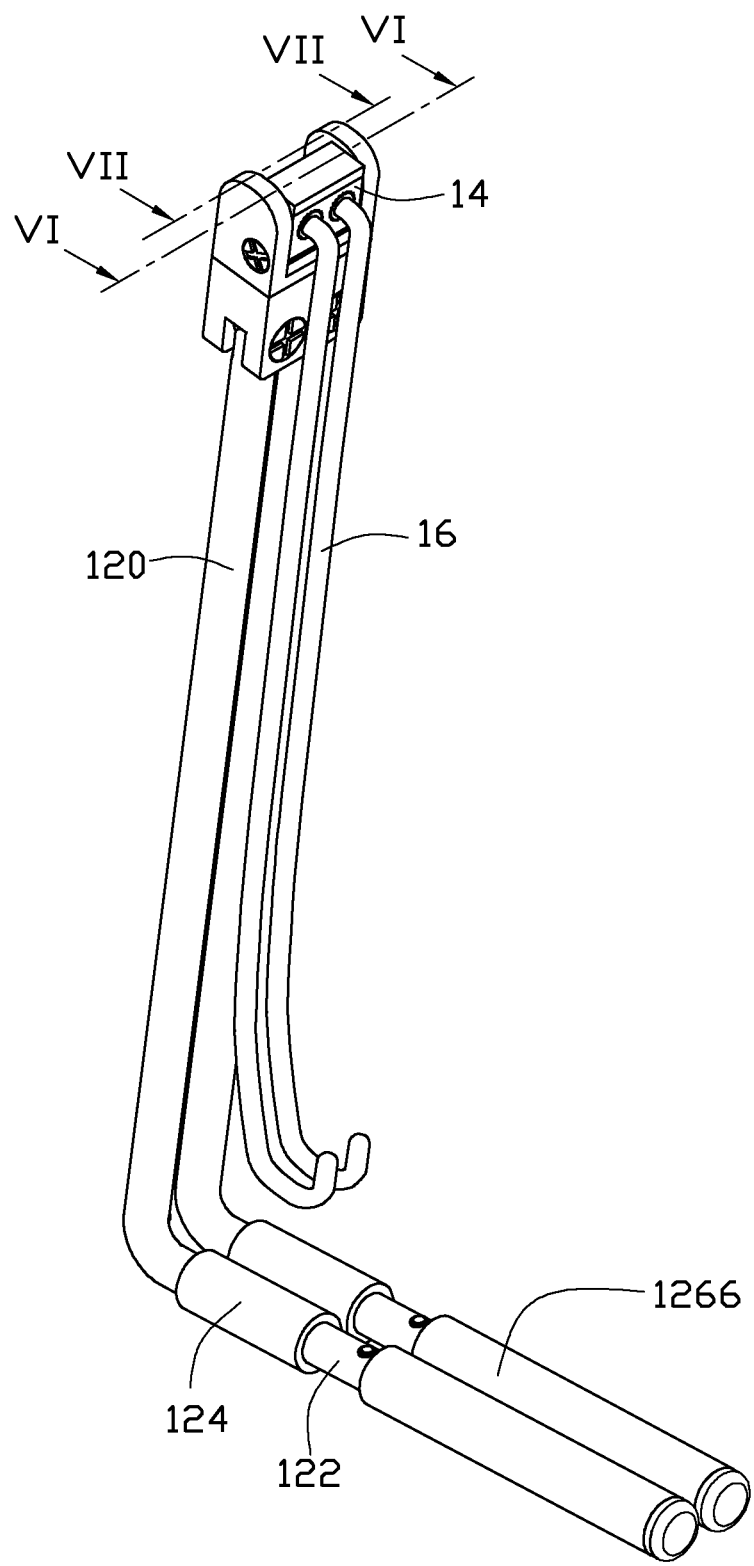
FIG. 5 is an isometric view of the support structure of FIG. 1, with a pair of stands and a pair of holding arms closed up.

Referring to FIG. 5, when not required, the open stands 12 and the open holding arms 16 can be closed up. The top hinge 14 can be rotated to bring the holding arms 16 close to the stands 12. The extending stabilizing extension 1266 can be retracted back on the auxiliary stand 122. Thus, the storage space required for the support structure 1 is minimal It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A support structure for holding an electronic device, comprising:
    a base;
    a pair of stands connected to a side of the base to support the base, each of the pair of stands being rotatable around a first rotation axis;
    a top hinge connected to an opposite side of the base, the top hinge being rotatable around a second rotation axis which is perpendicular to the first rotation axis; and
    a pair of holding arms rotatably connected to the top hinge for holding the electronic device and adjusting a tilt angle of the electronic device held by the holding arms by a rotation of the top hinge and a height of the electronic device held by the holding arms by a rotation of the pair of stands;
    wherein the base defines a pair of connecting grooves correspondingly at two opposite ends of one side of the base for connecting the stands, each of the stands comprises a main part, a connecting end formed at one end of the main part, and a supporting part formed at an opposite end of the main part, the supporting part is bent from the main part, the base comprises a fixing plate rotatably connected to the top hinge and a connecting part rotatably connected to the pair of the stands, the fixing plate comprises a bottom board and a pair of side arms perpendicularly extending upward at two opposite sides of the bottom board, the pair of the side arms defines a receiving space therebetween, the top hinge assembled with the holding arms is placed in the receiving space and rotatably connected to the side arms, the top hinge comprises a case body having an opening at one side and an upper cover, the case body comprises a front plate, a back plate parallel to the front plate, and a pair of side plates correspondingly connected to opposite sides of both the front plate and the back plate, each of the holding arms is rotatably engaged on the front plate and the back plate, the upper cover comprises a cover plate and a plurality of clipping protrusions extending out from the cover plate, the upper cover covers on the opening of the case body, the clipping protrusions are inserted into the case body and define a gap between every two immediately adjacent clipping protrusions, and each of the holding arms is clipped in a respective gap of the clipping protrusions.

2. The support structure of claim 1, further comprising a telescopic assembly attached to each of the pair of stands to selectably extend a length of the stand, wherein the telescopic assembly comprises a button set, a telescopic resilient element, and a stabilizing extension, the button set is received in an interior of the stand, the stabilizing extension slidably sleeves on the stand, the telescopic resilient element is pressed in the stabilizing extension, the button set releasably holds the stabilizing extension at a position sleeving the stand, when the stabilizing extension is released from the bottom set, the stabilizing extension slides away from the stand by a restoring force of the telescopic resilient element.

3. The support structure of claim 2, wherein an end of the stand away from the base is open, the telescopic assembly comprises a resisting member connected to the opened end of the stand, an end of the telescopic resilient element close to the stand resists against the resisting member.

4. The support structure of claim 3, wherein the resisting member comprises a resisting block and a threaded post extending outward from one side of the resisting block, the threaded post screws into the opened end of the stand, an external diameter of the resisting block is larger than an external diameter of the stand, the resisting block covers the opened end.

* * * * *